US006436501B1

(12) United States Patent
Steadman

(10) Patent No.: US 6,436,501 B1
(45) Date of Patent: Aug. 20, 2002

(54) MARKER ASSEMBLY

(75) Inventor: Stuart Steadman, Swindon (GB)

(73) Assignee: Tyco Electronics U.K. LTD, Dorcan Swindon (GB)

( * ) Notice: Subject to any disclaimer, the term of this patent is extended or adjusted under 35 U.S.C. 154(b) by 0 days.

(21) Appl. No.: 09/011,588

(22) PCT Filed: Aug. 7, 1996

(86) PCT No.: PCT/GB96/01919

§ 371 (c)(1), (2), (4) Date: Feb. 13, 1998

(87) PCT Pub. No.: WO97/07490

PCT Pub. Date: Feb. 27, 1997

(30) Foreign Application Priority Data

Aug. 18, 1995 (GB) .............................................. 9516958
Nov. 3, 1995 (GB) .............................................. 9522725

(51) Int. Cl.[7] .................................................. B32B 5/18

(52) U.S. Cl. .................... 428/41.8; 428/40.1; 428/41.7; 428/42.1; 428/42.3; 428/53; 428/143; 428/192; 428/200; 428/201

(58) Field of Search ............................... 428/40.1, 41.7, 428/41.8, 143, 42.1, 42.3, 53, 200, 192, 201

(56) References Cited

U.S. PATENT DOCUMENTS 3,344,528 A 10/1967 Purdum et al. ............... 33/174
4,348,454 A * 9/1982 Eckberg ...................... 428/334
4,465,717 A 8/1984 Crofts et al. .................. 428/40
5,183,696 A * 2/1993 Sanderson .................. 428/194
5,411,777 A * 5/1995 Steele et al. ............... 428/34.9
5,435,963 A 7/1995 Rackovan et al. .......... 264/509
5,458,938 A * 10/1995 Nygard et la. ............. 428/40.2
5,571,587 A * 11/1996 Bishop et al. ................ 428/43

FOREIGN PATENT DOCUMENTS

DE 26 29 131 A1 1/1978
EP 0 237 258 A2 9/1987 ............. G09F/3/04
EP 0 281 354 A2 9/1988 ............ C09D/5/02
WO WO 89/06191 7/1989 ............ B41M/5/18

OTHER PUBLICATIONS

International Search Report for International Application No. PCT/GB96/01919 dated Oct. 30, 1996.

Search Report for Great Britian Application No. GB 9516958.7.

Search Report for Great Britian Application No. PCT/ GB96.01919, Mailed Oct. 30, 1996.

* cited by examiner

*Primary Examiner*—Harold Pyon
*Assistant Examiner*—Sandra M. Nolan

(57) ABSTRACT

Replacing silicone paper release sheet of known adhesive-backed roll-feed 50 micron polyester curable marker product with 90+ (pref. 100) micron plastics release sheet 12 enables A4 sheets to be printed in sheet-fed printers with reduced curling or multi-sheet feeding and enables release sheet to be made from economically desirable non-stress-relieved plastics, whereas thinner plastics release sheets (and the polyester marker backing 10) need stress relief to survive heat-curing of the printed material without unacceptable distortion. Preferred versions have spacing means 14, preferably a strip of adhesive tape, projecting from the surface of the release sheet 12 facing away from the printable marker 10 to facilitate separation of sheets from a stack thereof by maintaining air gaps between adjacent sheets in the stack.

13 Claims, 1 Drawing Sheet

MARKER ASSEMBLY

BACKGROUND OF THE INVENTION

1. Field of the Invention

This invention relates to marker assemblies comprising a support sheet having a surface provided with a porous coating of latent curable material capable of receiving printed indicia, which coating is capable of being subsequently cured to render the indicia substantially indelible.

2. Brief Description of the Background Art

Marker assemblies comprising a support sheet having a surface provided with a porous coating of latent curable material capable of receiving printed indicia are described in our EP-B-0237258, and one commercially successful form thereof comprises a 50-micrometer-thick polyester support sheet having a layer of adhesive on the surface not carrying the porous coating and having a silicone-coated release paper removably adhering to the adhesive. These known assemblies are very successful for use with roll-fed printers, but have unexpectedly proved at times to be unsuitable for sheet-fed printers requiring a supply of sheets in the A3 to A5 size-range, preferably A4. The present invention provides sheets in that size-range using a new construction of marker assembly for improved sheet-fed printing.

SUMMARY OF THE INVENTION

The invention accordingly provides a marker assembly in substantially rectangular form of edge dimensions not greater than A3 sheet size and not less than A5 sheet size, comprising (i) a support sheet having a surface provided with a porous coating of latent curable material capable of receiving printed indicia, which coating is capable of being subsequently cured to render the indicia substantially indelible, the porous coating preferably being in particulate and/or filamentary form, (ii) a layer of adhesive on the surface of the support sheet not carrying the porous coating, and (iii) a plastics release sheet of at least 90 micrometers thickness removably adhered to and covering at least part of the adhesive layer.

DETAILED DESCRIPTION OF THE PREFERRED

Figure 1:
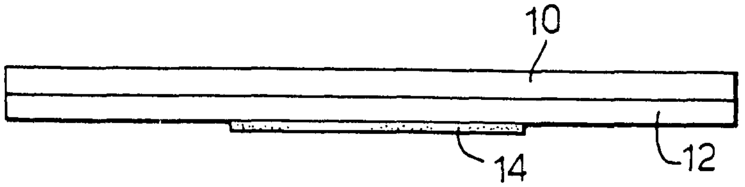
FIG. 1 shows schematically, in end view, a single marker assembly according to the invention.

The construction of the marker assembly of the present invention may be adapted to promote a number of commercially attractive features in the aforementioned sheet sizes. The plastics release sheet of 90 micrometers or more thickness tends to resist curling, which has been found to be a problem with the known silicone release papers in A4 size sheets. It is well adapted to die cutting of individual markers from the printable sheet, being less prone to accidental through-cutting of the release sheet, which has been found to occur when the curling problem was addressed by using certain release papers coated on both sides with silicone release agent. It tends to resist multi-sheet feedings, which can be caused by electrostatic attraction when thinner plastics release sheets are used, for example 50-micrometer-thick polyester sheet similar to that used for the known support sheet. And most unexpectedly, at 90 micrometers or more thickness it can be, and preferably is, made from economically-advantageous plastics sheet which has not been stress-relieved, unlike the preferred support sheet which is stress-relieved to render it heat-stable under at least some conditions subsequently used to cure heat-curable porous coatings. Thinner release sheets made from non-stress-relieved plastics (e.g. polyester) sheet of 50 or 75 micrometers thickness have been found to become unacceptably distorted during such curing.

The upper thickness limit of the release sheet is not critical, provided that the resulting assembly remains suitable for the sheet-fed printers in question, but it will generally be economically preferable to use thicknesses near the specified minimum, for example within the range from 90 to 120 or 90 to 110 micrometers, thicknesses of 95 to 105, preferably close to 100, micrometers being convenient for polyester release sheets, which are preferred, especially in conjunction with polyester support sheets. The release sheet may be made of an inherently non-adherent plastics material, but will preferably have a surface coating of a known release material, for example polysiloxane (silicone) release coatings, since this allows greater freedom of choice for the release sheet material to suit sheet feeding and economic requirements.

The components of the assembly other than the release sheet may be as described in EP-B-0237258, the disclosure of which is incorporated herein by reference. The release sheet may be made of plastics selected from to those described for the support sheet in EP-B-0237258, but polyesters are preferred, especially when the support sheet is made of polyester.

As a specific example to illustrate the invention, an A4-sized marker assembly according to the invention may be made using known assembly methods from a support sheet of 50-micrometers-thick heat-stabilised (stress-relieved) white Melanex ST529 (Trademark) polyester sheet from ICI, coated on one side with a curable porous layer as described in EP-B-0237258, and coated on the other side with a solvent-based pressure-sensitive acrylic adhesive available from National Starch and Chemical Ltd. under the Trademark Durotak 180-1197, the solvent being removed after coating. The dry adhesive coating is overlaid with a 100-micrometers-thick clear Melanex (Trademark) Type S polyester sheet from ICI having a silicone release coating pre-applied to the surface facing the adhesive. Sheets of A4 size cut from this assembly by known methods have been found satisfactory for sheet-fed printing in known ink-jet printers.

The invention includes a method of producing markers comprising printing indicia on the porous coating of one or more of the novel assemblies hereinbefore described by means of a sheet-fed printer, preferably an ink-jet printer, and preferably including the step of curing, preferably heat-curing, the printed porous coating to render the indicia substantially indelible .

The substantial indelibility of the indicia may be determined as described in EP-B-0237258, the disclosure of which is incorporated herein by reference. The present invention includes a feature for advantageously reducing sheet-to-sheet adhesion, which adhesion may hinder feeding of the sheets individually from a stack thereof owing to electrostatic attraction and/or vacuum suction and/or frictional forces between successive sheets in the stack.

The invention accordingly provides a marker assembly as hereinbefore described, wherein the exposed surface of the said plastics release sheet facing away from the remainder of the assembly has spacing means projecting therefrom capable of maintaining one or more air gaps between the said release sheet and the adjacent porous coating of an adjacent similar assembly when in a stack of such assemblies, the said spacing means being arranged to provide the said air gap(s) at least in an edge region of the assembly which will be the leading edge region when fed from a stack of such assemblies to sheet handling equipment in use, thereby facilitating separation of individual assemblies from the stack.

The advantages of marker assemblies having a reduced tendency to stick together in a stack will be self-explanatory, regardless of whether the individual assemblies (hereinafter. sheets) from the stack are fed to the sheet handling equipment by means external to that equipment, or are pulled into the equipment by means incorporated therein.

A single air gap may be envisaged extending around the edges of a centrally-placed spacing means or extending in and out between a relatively large number of small projecting spacing means in the form of pads or "islands". In theory, such discrete projecting spacing means could become more numerous and smaller progressively until something approaching a coating of minute glass beads on the sheet surface might be achieved. However, such small projections may be less satisfactory than larger projecting surfaces from the point of view of friction against the adjacent porous coating of an adjacent sheet when one sheet slides over the other during the feeding operation. The sheet handling equipment will usually be a sheet-fed printer, for example an ink jet printer, or heating equipment used for curing the indica-bearing coating after printing, or other devices such as die cutters, conveyor belts etc.

It is preferred that the spacing means comprises at least one strip of plastics material adhered to the said release sheet. Whether adhered to the release sheet or formed integrally with it, the spacing means preferably comprises a single strip of material substantially centrally aligned with the intended direction of feed of the assembly in use. It will be understood that a single straight strip of material running more or less down the centre of the sheet in the direction of feed will often be the most economical form of spacing means. However, the shape of the spacing means is not necessarily limited to straight-edged rectangular strips.

When a single spacing strip is used as aforesaid, it is preferred that the width of the single spacing strip is at least 25 mm, preferably at least 50 mm, more preferably at least one third and not more than two thirds of the total width of the assembly, and preferably not more than 125 mm. Dimensions within these ranges may be selected so as to spread the effect of the two air gaps running down the opposed edges of the spacing strip to the most effective positions across the width of the sheets in the stack.

Single spacing strips are not however essential, and the spacing means may comprise two or more strips of material, preferably substantially symmetrically aligned with the intended direction of feed of the assembly in use.

In some cases, it may be sufficient to provide the spacing means and air gaps only in the region of the leading edge of the sheets, or extending only part way from the leading edge towards the opposite trailing edge of the assembly. However, it will usually be preferable that the spacing means and the air gap(s) extend continuously from the leading edge of the assembly to the opposite trailing edge of the assembly. In such a structure, the sheet-to-sheet adhesion-reducing effect of the air gaps will be felt over the entire length of the sheet instead of just a leading portion.

It is preferred that the spacing means has a substantially sheet-like smooth exterior surface facing away from the remainder of the assembly, since this will tend to reduce sliding friction between adjacent sheets as they are fed one by one from the stack. It is unnecessary to quantify exactly the degree of smoothness of the spacing means exposed surface, but it is clearly a case of "the smoother the better" and coherent polymer films will usually be more satisfactory than rough or corrugated surfaces such as the back of crepe paper masking tape.

It is very much preferred that the spacing means is adhered to the said release sheet by an adhesive that permits movement of the spacing means along the surface of the release sheet at temperatures experienced by the spacin means during curing of the indicia-receiving porous coating in use. For this purpose, the spacing means preferably comprises a low-tack pressure-sensitive adhesive protective tape, for example that available under the trademark "Flowstrip FL205" from Flowstrip Limited of Scunthorpe, England. This is especially relevant when the spacing means comprises a polymeric film material which may undergo some longitudinal shrinkage at elevated temperatures. The movement permitted by the preferred adhesive allows such shrinkage to occur without curling to an unacceptable extent the release sheet to which the tape adheres. It has been found that shrinkage of 2–3 mm at each end of the preferred pressure-sensitive adhesive tape can thus be accommodated without curling the assembly as a whole.

The thickness of the spacing means is not critical, but it may be preferable that the spacing means projects from the release sheet to a distance within the range from 25 to 100 micrometers. Pressure-sensitive adhesive tapes of such thickness are accordingly preferred, the aforementioned tape FL205 being approximately 50 micrometers thick.

The marker assemblies according to this invention are especially useful in methods of feeding the assemblies one at a time from a stack thereof to sheet handling equipment, wherein means are provided for reducing static charge on the assemblies during such feeding. Such static reduction means, for example known anti-static bars, enhance the adhesion-reducing effect of the aforementioned air gaps and have been found to enable trouble-free feeding of a stack of up to 25 A4-size sheets into a desk top inkjet printer. It is understood that references in the original co-pending application and herein to sheet sizes in the A3 to A5 size range do not restrict the sheets to "A" proportions. U.S. quarto, foolscap and other sizes, and the standard sizes of other countries may all be included within the overall dimensional range from A3 to A5.

Specific embodiments of the present invention will now be described by way of example, with reference to the accompanying drawings wherein Referring to the drawings, FIG. 1 shows the coated A4 support sheet 10 adhered by a layer of adhesive (not shown) to a plastics release sheet 12 of at least 90 micrometers thickness as described in the aforementioned co-pending application, with a 75mm wide strip of the aforementioned FL205 low tack protective tape 14 adhered to the release sheet 12 in a substantially central position with respect to the width of the assembly as shown in this end view.

Figure 2:
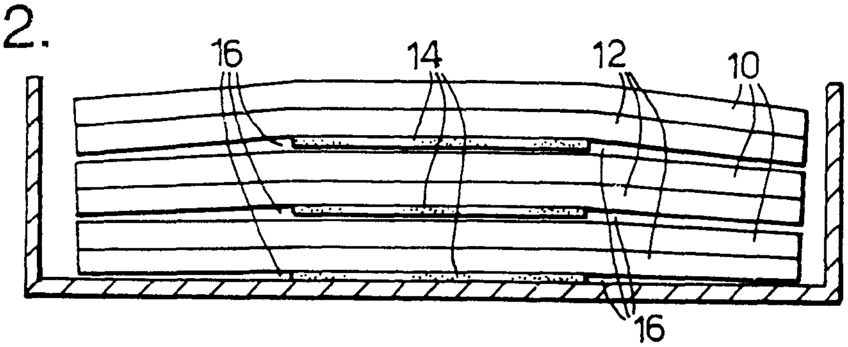
FIG. 2 shows schematically a stack of three marker assemblies in a sectioned feed tray.

When sheets such as that shown in FIG. 1 are stacked in use for feeding through a printer, as shown in FIG. 2, the 50 micrometers thickness of the projecting tape 14 will result in air gaps 16 between the release sheet 12 carrying the tape and the porous coating of the carrier sheet 10 of the adjacent assembly in the stack. The proportions and shape of the air gaps 16 have been exaggerated for clarity in this diagram.

Figure 3:
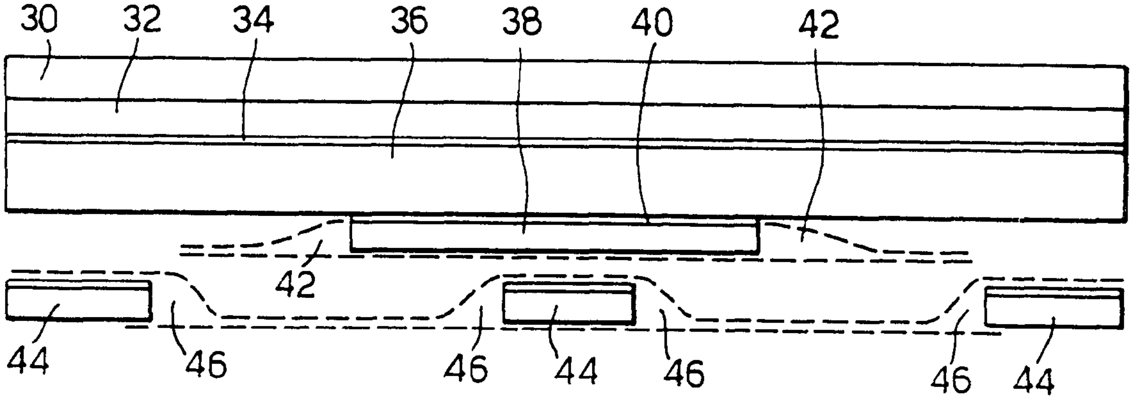
FIG. 3 shows, in magnification, the end view of two possible structures for a marker assembly according to the invention.

The structure of the assemblies according to this aspect of the invention is shown in more detail in the schematic end view of FIG. 3. The marker assembly comprises the porous coating (30) of latent curable material capable of receiving printed indica, which coating is carried on the support sheet (32), the opposite surface of which carries the layer of adhesive (34) to which is adhered the plastics release sheet (36), all as described in the aforementioned co-pending application. This A4 assembly is approximately 210 mm in width and the various layers constituting it may for example be 60 micrometers thick curable coating (30), 50 micrometers thick Melinex (trademark) ST 529 support sheet (32), 10 micrometers thick pressure-sensitive adhesive (34), and 100 micrometers thick Melinex (trademark) type S release sheet (36). The 50 micrometers thick FL 205 low tack protective tape (38) is adhered to the exposed surface of the release sheet (36) by its low tack adhesive layer (40) and produces air gaps (42), corresponding to air gaps (16) of FIG. 2 as schematically indicated by broken lines in FIG. 3.

In an alternative embodiment of the invention, the tape (38) of 75 mm width could be replaced by three strips (44) of similar tape of 25 mm width evenly spaced across the width of the assembly and extending from the leading edge all the way to the trailing edge as aforementioned. In such an arrangement, there would be four air gaps (46) as schematically indicated by the broken lines associated with the three strips of tape (44).

Figure 4:
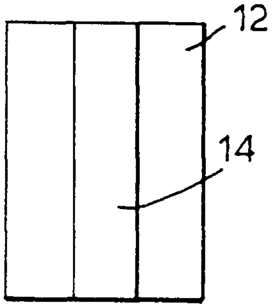
FIGS. 4–6 show schematically, in plan view, different arrangements of a spacing device on the surface of a release sheet.

FIG. 4 illustrates schematically the preferred arrangement of a single strip of spacing tape (14) positioned substantially centrally and extending all the way from the leading edge to the trailing edge of the release sheet (12) of a structure similar to FIG. 1 as viewed from below.

Figure 5:
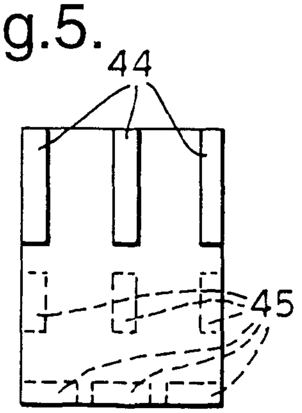

FIG. 5 shows possible alternative structures having three strips of tape (44) extending only part way from the leading edge towards the trailing edge, with possible further short strips (45) indicated in broken lines to extend the spacing effect over more of the sheet area.

Figure 6:
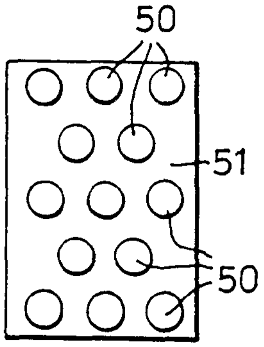

FIG. 6 shows another possible, though generally less preferred, alternative having a number of smaller round portions of spacing tape (50) distributed over the surface of the release sheet (51).

What is claimed is:

1. A marker assembly in substantially rectangular form of edge dimensions ranging from about 140 millimeters by 210 millimeters to about 290 millimeters by 420 millimeters, comprising:

(i) a support sheet having a surface provided with a porous coating of latent curable material for receiving printed indicia, which coating is subsequently cured to render the indicia substantially indelible, (ii) a layer of adhesive on the surface of the support sheet not carrying the porous coating, (iii) a non-stress relieved plastic release sheet of at least 90 micrometers thickness removably adhered to and covering at least part of the adhesive layer, and (iv) a spacing device projecting from the surface of the release sheet facing away from the remainder of the assembly, said spacing device being a means of providing air gaps at least in an edge region of the assembly for facilitating separation of individual assemblies from a stack of such assemblies, which region will be the leading edge region when the assembly is fed from said stack to sheet handling equipment and wherein the spacing device is adhered to the release sheet by an adhesive that permits movement of the spacing device at temperatures experienced by the device during curing of the porous coating.

2. An assembly according to claim 1, wherein the support sheet or the release sheet or both comprise polyester material.

3. An assembly according to claim 1, wherein the release sheet carries a release coating comprising polysiloxane material.

4. An assembly according to claim 1 having edge dimensions of about 210 by 300 millimeters.

5. An assembly according to claim 1, wherein the said spacing device comprises a single strip of material substantially centrally aligned with the intended direction of feed of the assembly in use.

6. An assembly according to claim 5, wherein the width of said single spacing strip is at least 25 mm.

7. An assembly according to claim 1, wherein the said spacing device comprises two or more strips of material substantially symmetrically aligned with the intended direction of feed of the assembly in use.

8. An assembly according to claim 1, wherein the spacing device and the air gap extend from the leading edge of the assembly to the opposite trailing edge of the assembly.

9. An assembly according to claim 1, wherein the spacing device has a substantially smooth sheet-like exterior surface facing away from the remainder of the assembly.

10. An assembly according to claim 1, wherein the spacing device is adhered to the said release sheet by an adhesive which permits movement of the spacing device along the surface of the release sheet at temperatures experienced by the spacing device during curing of the indicia-receiving porous coating.

11. As assembly according to claim 10, wherein the spacing device comprises a low-tack pressure-sensitive adhesive protective tape.

12. An assembly according to claim 1, wherein the spacing device projects from the release sheet to a distance ranging from about 25 to about 100 micrometers.

13. An assembly according to claim 1, wherein the porous coating is in a form selected from the group consisting of particulate, filamentary, and a combination thereof.

* * * * *